(12) United States Patent
Mitsunari et al.

(10) Patent No.: US 6,411,571 B1
(45) Date of Patent: Jun. 25, 2002

(54) DISK CHANGER CAPABLE OF CONTROLLING A PLURALITY OF DRIVERS

(75) Inventors: Yoshitaka Mitsunari; Atsuki Tada; Harui Koizumi; Satomi Kasuga; Hiroshi Sugawara, all of Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/520,147

(22) Filed: Mar. 7, 2000

(30) Foreign Application Priority Data

Mar. 8, 1999 (JP) .......................................... 11-060531

(51) Int. Cl.[7] .............................................. G11B 17/22
(52) U.S. Cl. ................................ 369/30.31; 369/178.01
(58) Field of Search .............................. 369/34, 30, 36, 369/37, 38, 39, 178

(56) References Cited

U.S. PATENT DOCUMENTS 5,615,345 A * 3/1997 Wanger ...................... 710/129
5,956,301 A * 9/1999 Dimitri et al. ................ 369/34
6,038,490 A * 3/2000 Dimitri et al. .............. 700/214
6,052,341 A * 4/2000 Bingham et al. ............. 369/34
6,185,165 B1 * 2/2001 Jesionowski et al. ......... 369/34
6,205,093 B1 * 3/2001 Abbott et al. ................. 369/34

* cited by examiner

Primary Examiner—Tan Dinh
(74) Attorney, Agent, or Firm—Sughrue Mion, PLLC

(57) ABSTRACT

Prior to the control of disk transportation, from each of plural incorporated disk drives, a changer controller acquires an identifier peculiar to the disk drive via a local bus line, and recognizes correspondence relationships between element addresses and the disk drives. In response to arrival of a first request command, the recognized correspondence relationships are sent to a computer system serving as the request source. Furthermore, in response to arrival of a second command, also each of the disk drives sends the identifier to the computer system serving as the request source via the SCSI controller.

14 Claims, 14 Drawing Sheets

FIG. 2

| ELEMENT ADDRESS (EA) | SCSI ID | IDENTIFIER |
|---|---|---|
| 4000 | 0 | aaa |
| 4001 | 1 | bbb |
| 4002 | 0 | ccc |
| 4003 | 1 | ddd |
| 4004 | 2 | eee |
| 4005 | 3 | fff |
| 4006 | 4 | ggg |
| 4007 | 5 | hhh |
| 4008 | 6 | iii |
| 4009 | 0 | jjj |
| 4010 | 1 | kkk |
| 4011 | 2 | lll |
| 4012 | 3 | mmm |
| 4013 | 4 | nnn |
| 4014 | 5 | ooo |
| 4015 | 6 | ppp |

FIG. 3

| SCSI BUS NUMBER | SCSI ID | DEVICE | IDENTIFIER |
|---|---|---|---|
| 1 | 7 | HOST ADAPTER (OWN) | |
| | 6 | NONE | |
| | 5 | CHANGER CONTROLLER | |
| | 4 | NONE | |
| | 3 | NONE | |
| | 2 | NONE | |
| | 1 | DRIVE | bbb |
| | 0 | DRIVE | aaa |
| 2 | 7 | HOST ADAPTER (OWN) | |
| | 6 | DRIVE | iii |
| | 5 | DRIVE | hhh |
| | 4 | DRIVE | ggg |
| | 3 | DRIVE | fff |
| | 2 | DRIVE | eee |
| | 1 | DRIVE | ddd |
| | 0 | DRIVE | ccc |
| 3 | 7 | HOST ADAPTER (OWN) | |
| | 6 | DRIVE | ppp |
| | 5 | DRIVE | ooo |
| | 4 | DRIVE | nnn |
| | 3 | DRIVE | mmm |
| | 2 | DRIVE | lll |
| | 1 | DRIVE | kkk |
| | 0 | DRIVE | jjj |

FIG. 4

| ELEMENT ADDRESS (EA) | IDENTIFIER | SCSI ID | SCSI BUS NUMBER |
|---|---|---|---|
| 4000 | aaa | 0 | 1 |
| 4001 | bbb | 1 | |
| 4002 | ccc | 0 | 2 |
| 4003 | ddd | 1 | |
| 4004 | eee | 2 | |
| 4005 | fff | 3 | |
| 4006 | ggg | 4 | |
| 4007 | hhh | 5 | |
| 4008 | iii | 6 | |
| 4009 | jjj | 0 | 3 |
| 4010 | kkk | 1 | |
| 4011 | lll | 2 | |
| 4012 | mmm | 3 | |
| 4013 | nnn | 4 | |
| 4014 | ooo | 5 | |
| 4015 | ppp | 6 | |

PROCESS OF SUCKING IDENTIFIER FROM DRIVE

FIG. 11A

| ELEMENT ADDRESS (EA) | SCSI ID |
|---|---|
| 4000 | 1 |
| 4001 | 2 |
| 4002 | 3 |
| 4003 | 4 |

FIG. 11B

| SCSI ID | DEVICE |
|---|---|
| 7 | HOST ADAPTER (OWN) |
| 6 | NONE |
| 5 | CHANGER CONTROLLER |
| 4 | DRIVE |
| 3 | DRIVE |
| 2 | DRIVE |
| 1 | DRIVE |
| 0 | NONE |

FIG. 13

| ELEMENT ADDRESS (EA) | SCSI ID |
|---|---|
| 4000 | 0 |
| 4001 | 1 |
| 4002 | 0 |
| 4003 | 1 |
| 4004 | 2 |
| 4005 | 3 |
| 4006 | 4 |
| 4007 | 5 |
| 4008 | 6 |
| 4009 | 0 |
| 4010 | 1 |
| 4011 | 2 |
| 4012 | 3 |
| 4013 | 4 |
| 4014 | 5 |
| 4015 | 6 |

FIG. 14

| SCSI BUS NUMBER | SCSI ID | DEVICE |
|---|---|---|
| 1 | 7 | HOST ADAPTER (OWN) |
|   | 6 | NONE |
|   | 5 | CHANGER CONTROLLER |
|   | 4 | NONE |
|   | 3 | NONE |
|   | 2 | NONE |
|   | 1 | DRIVE |
|   | 0 | DRIVE |
| 2 | 7 | HOST ADAPTER (OWN) |
|   | 6 | DRIVE |
|   | 5 | DRIVE |
|   | 4 | DRIVE |
|   | 3 | DRIVE |
|   | 2 | DRIVE |
|   | 1 | DRIVE |
|   | 0 | DRIVE |
| 3 | 7 | HOST ADAPTER (OWN) |
|   | 6 | DRIVE |
|   | 5 | DRIVE |
|   | 4 | DRIVE |
|   | 3 | DRIVE |
|   | 2 | DRIVE |
|   | 1 | DRIVE |
|   | 0 | DRIVE |

US 6,411,571 B1

DISK CHANGER CAPABLE OF CONTROLLING A PLURALITY OF DRIVERS

BACKGROUND OF THE INVENTION

The present invention relates to a changer which transports one of many housed information recording media (for example, disks) that is designated by a computer system, to a designated one of plural incorporated information recording medium driving means (for example, disk drives), thereby enabling the computer system to rapidly access any one of the many housed information recording media, and particularly to a changer which can incorporate information recording medium driving means in a larger number (for example, sixteen) than the maximum number of devices that can be supported by one SCSI bus.

As a device for providing rapidly and accurately only required information among an enormous quantity of information stored in many information recording media (for example, disks such as CD-ROMs, CD-Rs, DVD-ROMs, DVD-Rs) to a computer system, conventionally, known is a changer configured in the following manner. Among many housed disks, a disk which is designated by the computer system is transported to designated one of plural incorporated disk drives, so that the computer system can access any one of the many housed disks.

FIG. 10 schematically shows a usual electrical hardware configuration of an example of a changer of the conventional art, and connection relationships between the changer and a computer system. As shown in the figure, the changer 1 incorporates a changer controller 2 which mainly controls transportation of disks, and four disk drives 31 to 34 which are mounted at positions identified by a series of element addresses (EA) and serve as transport destinations of the disks, respectively.

The computer system 6 is connected to each of elements (the changer controller 2 and the disk drives 31 to 34) of the changer 1 via a SCSI (an abbreviation for Small Computer System Interface) bus. Eight SCSI controllers respectively corresponding to SCSI IDs=0 to 7 can be connected to a SCSI bus of an 8-bit width. In this example, a SCSI controller (host adapter) 47 corresponding to SCSI ID=7 is connected to the computer system 6, a SCSI controller 45 corresponding to SCSI ID=5 is connected to the changer controller 2, and SCSI controllers 41 to 44 corresponding to SCSI IDs=1 to 4 are connected to the four disk drives 31 to 34, respectively. There are no SCSI controllers corresponding to SCSI IDs=0 and 6.

In the changer 1, between the changer controller 2 and device connectors (not shown) corresponding to the element addresses (EA), a local bus line 5 elongates through which drive identification data are sucked from a disk drive connected to the connector, to the changer controller 2. In this example, as the drive identification data, the SCSI IDs (IDs=1 to 4) allocated to the SCSI controller to which the disk drive are connected is used as they are, because, when there is only one SCSI bus, the SCSI IDs correspond to the disk drives in one to one relationship. The SCSI IDs can be respectively set for the SCSI controllers by using a DIP switch or the like. As required, the SCSI IDs can be read from the side of the disk drives. The SCSI IDs set by the DIP switch or the like are used also for enabling the computer system 6 to access a desired one of the disk drives via the corresponding SCSI controller.

In order to enable the computer system 6 to read desired data from one of the disks housed in the disk changer 1, instructions for transporting the disk to one of the disk drives 31 to 34, and also those for controlling the disk drive serving as the transport destination of the disk and reading the desired data from the transported disk must be given from the computer system 6 to the disk changer 1. These instructions are given by issuing predetermined commands (hereinafter, such commands are referred to as "disk transportation command," and "disk access command," respectively) onto the SCSI bus from the computer system 6 while designating the corresponding SCSI ID.

Specifically, the instructions for transporting a specific disk to one of the disk drives 31 to 34 are performed in the following manner. The computer system 6 issues the disk transportation command (containing designation of the disk) onto the SCSI bus while designating the SCSI ID (ID=5) allocated to the SCSI controller 45 to which the changer controller 2 is connected. At this time, in the designation of the disk drive of transport destination, the element address EA allocated for specifying the disk drive in the changer is used in place of the SCSI ID of the SCSI controller to which the disk drive is connected. This is specified in the SCSI standard. In the disk transportation control performed by the changer controller 2, it is necessary and sufficient that only the changer controller 2 recognizes the physical position of a disk drive to which a disk is to be transported. Therefore, the element address EA having a one to one relationship with the physical position of the disk drive is used as a logical address.

By contrast, the instructions for controlling the disk drive positioned at the transport destination of the disk and reading the desired data from the disk set to the disk drive are performed in the following manner. The computer system 6 issues the disk access command onto the SCSI bus while designating the SCSI ID allocated to the SCSI controller to which the transport destination disk drive is connected.

In the changer 1, correspondence relationships between SCSI IDs for recognizing the disk drives and the element addresses EA given to the disk drives are not uniquely defined. When the disk transportation command and the disk access command are to be issued, therefore, the computer system 6 must previously recognize correspondence relationships in the changer 1, i.e., those between the SCSI ID for identifying a disk drive and the element address EA indicating the position where the disk drive is mounted. The correspondence relationships are recognized by the computer system 6 in the following procedure.

Prior to the disk transportation control, first, the changer controller 2 acquires the SCSI IDs serving as drive identification data from the four incorporated disk drives 31 to 34 via the local bus line 5, and recognizes correspondence relationships between the element addresses EA and the disk drives (SCSI IDs). The acquisition of the SCSI IDs by the changer controller 2 can be performed in any one of various know methods. In this example, the changer controller 2 first performs an initializing process immediately after power-on, or issues a predetermined internal request command via the local bus line 5 to each of the four incorporated disk drives 31 to 34 which are incorporated in the changer and which can be respectively designated by the corresponding element address. In response to the command, the disk drives 31 to 34 read the SCSI IDs (=1 to 4) from their own SCSI controllers 41 to 44, respectively, and send the SCSI IDs to the changer controller 2 via the local bus line 5. When the changer controller 2 receives the SCSI IDs, the changer controller recognizes correspondence relationships between the SCSI IDs of the disk drives 31 to 34 and the element addresses. In FIG. 11A, an example of the thus recognized correspondence relationships is shown in the form of a table. As seen from the table, in the example, it is recognized that the four disk drives 31 to 34 are mounted at positions indicated by element addresses EA=4000 to 4003, and the SCSI IDs of the disk drives 31 to 34 are 1 to 4, respectively.

In order to correctly issue various commands to the elements (the changer controller 2 and the disk drives 31 to 34) of the changer 1, the computer system 6 must previously know the manner of connecting the elements to the SCSI bus. Prior to the start of the control, therefore, the computer system 6 sequentially issues an inquiry command to all the SCSI IDs (=0 to 7), and, on the basis of device types which are sent from the SCSI controllers in response to the command, recognizes correspondence relationships between the SCSI IDs and the device types. In FIG. 11B, the thus recognized correspondence relationships between the SCSI IDs and the device types are shown in the form of a table. As seen from the table, according to the correspondence relationships, it will be seen that the changer controller 2 is connected to the SCSI controller corresponding to the SCSI ID=5.

The computer system 6 acquires the correspondence relationships of FIG. 11A which have been recognized by the changer controller 2, as they are to recognize the correspondence relationships between the SCSI IDs for identifying the disk drives and the element addresses EA indicating the mounting positions of the disk drives. This recognition is performed in the following procedure. First, the computer system 6 issues a read element status command which is defined in the SCSI standard, while designating the SCSI ID (ID=5) allocated to the SCSI controller 45 to which the changer controller 2 is connected. In response to the command, the changer controller 2 sends the recognized correspondence relationships onto the SCSI bus, while designating the SCSI ID (ID=7) allocated to the command source. When the computer system 6 acquires the reply, the computer system recognizes the correspondence relationships between the SCSI ID for identifying the disk drive and the element address EA indicating the mounting position of the disk drive.

In a large changer such as that which can incorporate sixteen disk drives at the maximum, depending on the number of incorporated drives, there may arise a case where the drives cannot be supported by one SCSI bus because of the restriction that the maximum number of devices which can be connected to one SCSI bus of a 8-bit width is eight.

FIG. 12 schematically shows the electrical hardware configuration of a large changer incorporating sixteen disk drives, and connection relationships between the changer and a computer system. As shown in the figure, the changer 10 incorporates a changer controller 20 which mainly controls transportation of disks, and sixteen disk drives 301 to 316 which are mounted at positions identified by a series of element addresses (EA) and serve as transport destinations of the disks, respectively.

The computer system 60 is connected to elements (the changer controller 20 and the disk drives 301 to 316) of the changer 10 via three SCSI buses of an 8-bit width which are respectively identified by SCSI bus numbers #1 to #3. Eight SCSI controllers corresponding to SCSI IDs=0 to 7 can be connected to each of the three illustrated SCSI busses. In this example, with respect to SCSI bus #1, a SCSI controller (host adapter) 147 corresponding to SCSI ID=7 is connected to the computer system 60, a SCSI controller 145 corresponding to SCSI ID=5 is connected to the changer controller 20, and SCSI controllers 140 and 141 corresponding to SCSI IDs=0 and 1 are connected to two disk drives 301 and 302, respectively. There are no SCSI controllers corresponding to SCSI IDs=2, 3, 4, and 6. With respect to SCSI bus #2, a SCSI controller (host adapter) 247 corresponding to SCSI ID=7 is connected to the computer system 60, and SCSI controllers 240 to 246 corresponding to SCSI IDs=0 to 6 are connected to seven disk drives 303 to 309, respectively. With respect to SCSI bus #3, a SCSI controller (host adapter) 347 corresponding to SCSI ID=7 is connected to the computer system 60, and SCSI controllers 340 to 346 corresponding to SCSI IDs=0 to 6 are connected to seven disk drives 310 to 316, respectively.

In the changer 10, between the changer controller 20 and device connectors (not shown) corresponding to the element addresses (EA), a local bus line 50 elongates through which drive identification data are sucked from a disk drive connected to the connector, to the changer controller 20. In this example also, as the drive identification data, the SCSI IDs (IDs 0 to 7) allocated to the SCSI controllers to which the disk drive is connected are used as they are.

In the large changer 10 also, prior to the control of disk transportation, the changer controller 20 acquires the SCSI IDs serving as drive identification data from the sixteen incorporated disk drives 301 to 316 via the local bus line 50, and recognizes correspondence relationships between the element addresses EA and the disk drives (SCSI IDs). In FIG. 13, the thus recognized correspondence relationships are shown in the form of a table.

Prior to the start of the control, the computer system 60 sequentially issues an inquiry command to all the SCSI IDs (=0 to 7) of SCSI buses #1 to #3, and, on the basis of device types which are sent from the SCSI controllers in response to the command, recognizes correspondence relationships between the SCSI bus numbers, the SCSI IDs, and the device types. In FIG. 14, the thus recognized correspondence relationships between the SCSI IDs for the SCSI bus numbers, and the device types are shown in the form of a table.

The computer system 60 recognizes the SCSI bus number and the SCSI ID of the changer controller 20 from the correspondence relationships shown in the table of FIG. 14, and then issues a read element status command, thereby acquiring and recognizing the correspondence relationships between the element addresses EA and the disk drives (SCSI IDs) listed in the table of FIG. 13.

At this time, the contents of information for recognizing the correspondence relationships which are acquired finally by the computer system 60 produce a problem. As seen from the table of FIG. 13, in response to the internal request command, each of the disk drives of the element addresses (EA=4000 to 4015) sends to the changer controller 20 a reply the content of which coincides with the SCSI ID read from the SCSI controller connected to the disk drive. When two or more SCSI busses are used as in the case of the changer, therefore, the identical SCSI IDs appear although the element addresses EA are different from each other, so that the SCSI buses to which the SCSI IDs belong cannot be identified. As a result, there arises a problem in that it is impossible to, from an element address EA, identify the electrical connection route (access path) to the disk drive mounted at the address, via the SCSI. For example, the following case will be considered. The disk transportation command is issued and a disk is transported to an element address (EA=4001). Even when, while referring to the correspondence relationships shown in the table of FIG. 13, the computer system thereafter issues the disk access command to the transport destination disk drive to try to access the disk drive, it is known, from the table of FIG. 13, only that the element corresponding EA=4001 is a disk drive identified by SCSI ID=1. In other words, the SCSI bus to which the SCSI ID=1 belongs cannot be known. As a result, a necessary command cannot be correctly issued to the transport destination disk drive.

SUMMARY OF THE INVENTION

The invention has been conducted in view of the above discussed problem. It is an object of the invention to, in a changer wherein a computer system accesses disk drives by using two or more SCSI busses in such a case where disk drives are incorporated in a larger number than the maximum number of devices that can be supported by one SCSI bus, enable the computer system to correctly recognize correspondence relationships between the disk drives and element addresses where the disk drives are mounted.

In a first aspect of the invention, a changer comprising: a changer controller which controls transportation of an information recording medium; and information recording medium driving means mounted at a position indicated by an element address and serving as a transport destination of an information recording medium, and, in the changer, the changer controller includes first controlling means for recognizing correspondence relationships between identifiers respectively peculiar to incorporated information recording medium driving means and element addresses, and for, in response to a first command, sending information relating to the correspondence relationships between the identifiers and the element addresses, to a source of the command, and each of the information recording medium driving means includes second controlling means for, in response to a second command, sending the identifier, to a source of the command.

According to this configuration, the changer controller recognizes correspondence relationships between identifiers respectively peculiar to the incorporated information recording medium driving means and the element addresses, and, in response to arrival of the first command, the recognized correspondence relationships are sent to a source of the command (for example, a computer system). Furthermore, in response to arrival of the second command, also each of the information recording medium driving means sends the identifier to the command source (for example, the computer system). In the command source (for example, the computer system), therefore, the element addresses or logical addresses of the information recording medium driving means are related to the electric connection routes (access paths) in one to one relationship, on the basis of a peculiar identifier which is commonly contained in both sets of information respectively obtained through the two routes. Consequently, the computer system can directly control the information recording medium driving means mounted on the changer.

In a second aspect of the invention, the identifier is previously recorded in the information recording medium driving means, and the first controlling means acquires the identifier from incorporated information recording medium driving means, to recognize the correspondence relationship between the identifier and the element address. This configuration can attain the following effects in addition to the effects of the first aspect of the invention. The identifier sent to the changer control or the computer system is stored in a nonvolatile memory such as an EEPROM or a flash ROM in the information recording medium driving means. In order to produce the identifier peculiar to the information recording medium driving means, therefore, hardware modification of the changer controller is never required, and it is requested only to apply small software modification on the data transfer which is to be implemented via a local bus line. In both the exterior and the interior of the changer, peculiar identifiers can be easily allocated to the information recording medium driving means, respectively. Even when plural changers are used in a large scale system, therefore, correspondence relationships between the electrical connection routes (access paths) to disk drives and element addresses which are used in the disk transportation to the drives can be surely constructed.

In a third aspect of the invention, the identifier contains a product serial number of the information recording medium driving means.

This configuration can attain the following effect in addition to the effects of the second aspect of the invention. Since the identifier is a product serial number of the information recording medium driving means, the identifier may be incorporated into the information recording medium driving means in the production process of the means. In this case, there are no identical serial numbers in all the products, and hence each of the information recording medium driving means can be most surely identified.

In a fourth aspect of the invention, the first controlling means gives to incorporated information recording medium driving means the identifier corresponding to an element address of the incorporated information recording medium driving means, and the information recording medium driving means stores the given identifier.

This configuration can attain the following effect in addition to the effects of the first aspect of the invention. It is not necessary to previously store the peculiar identifiers in the information recording medium driving means. Therefore, the information recording medium driving means are not required to have a nonvolatile memory for storing the identifier.

In a fifth aspect of the invention, the changer controller and the information recording medium driving means are connected to a SCSI controller to which a SCSI bus can be connected.

This configuration can attain the following effect in addition to the effects of the first to fourth aspects of the invention. Even when the changer controller, the information recording medium driving means, and a computer system are connected to one another via SCSI busses, the computer system can correctly recognize correspondence relationships between the information recording medium driving means identified by a SCSI bus number and a SCSI ID, and the element addresses where the means are mounted, on the basis of the identifier which is peculiar to the information recording medium driving means and commonly contained in both sets of information respectively obtained through two routes.

In a sixth aspect of the invention, the first command is a read element status command which is defined in the SCSI standard.

This configuration can attain the following effect in addition to the effects of the fifth aspect of the invention. The read element status command which is defined in the SCSI standard is used as a condition for activating a control of transmission of the correspondence relationships from the changer controller to a computer system. Consequently, there is an advantage that necessary software modifications which are to be performed in the computer system and the changer controller can be minimized in degree.

In a seventh aspect of the invention, the second command is an inquiry command which is defined in the SCSI standard.

This configuration can attain the following effect in addition to the effects of the fifth or sixth aspect of the invention. The inquiry command which is defined in the SCSI standard is used as a condition for activating a control of transmission of the identifiers from the information recording medium driving means to a computer system. Consequently, there is an advantage that necessary software modifications which are to be performed in the computer system and the information recording medium driving means can be minimized in degree.

BRIEF DESCRIPTION OF THE DRAWINGS

FIG. 2 is a view showing correspondence relationships which are recognized by a changer controller prior to start of a control, in the form of a table.

FIG. 3 is a view showing correspondence relationships which are recognized by the computer system prior to start of a control, in the form of a table.

FIG. 4 is a view showing correspondence relationships which are recognized by the computer system prior to start of transportation and an access control, in the form of a table.

FIGS. 11A and 11B are views showing correspondence relationships which are recognized by a changer controller and the computer system in a system of the conventional art, in the form of a table.

FIG. 13 is a view showing correspondence relationships which are recognized by a changer controller in the large changer by a method of the conventional art.

FIG. 14 is a view showing correspondence relationships which are recognized by the computer system in the large changer by the method of the conventional art.

DETAILED DESCRIPTION OF THE PREFERRED EMBODIMENTS

Figure 1:
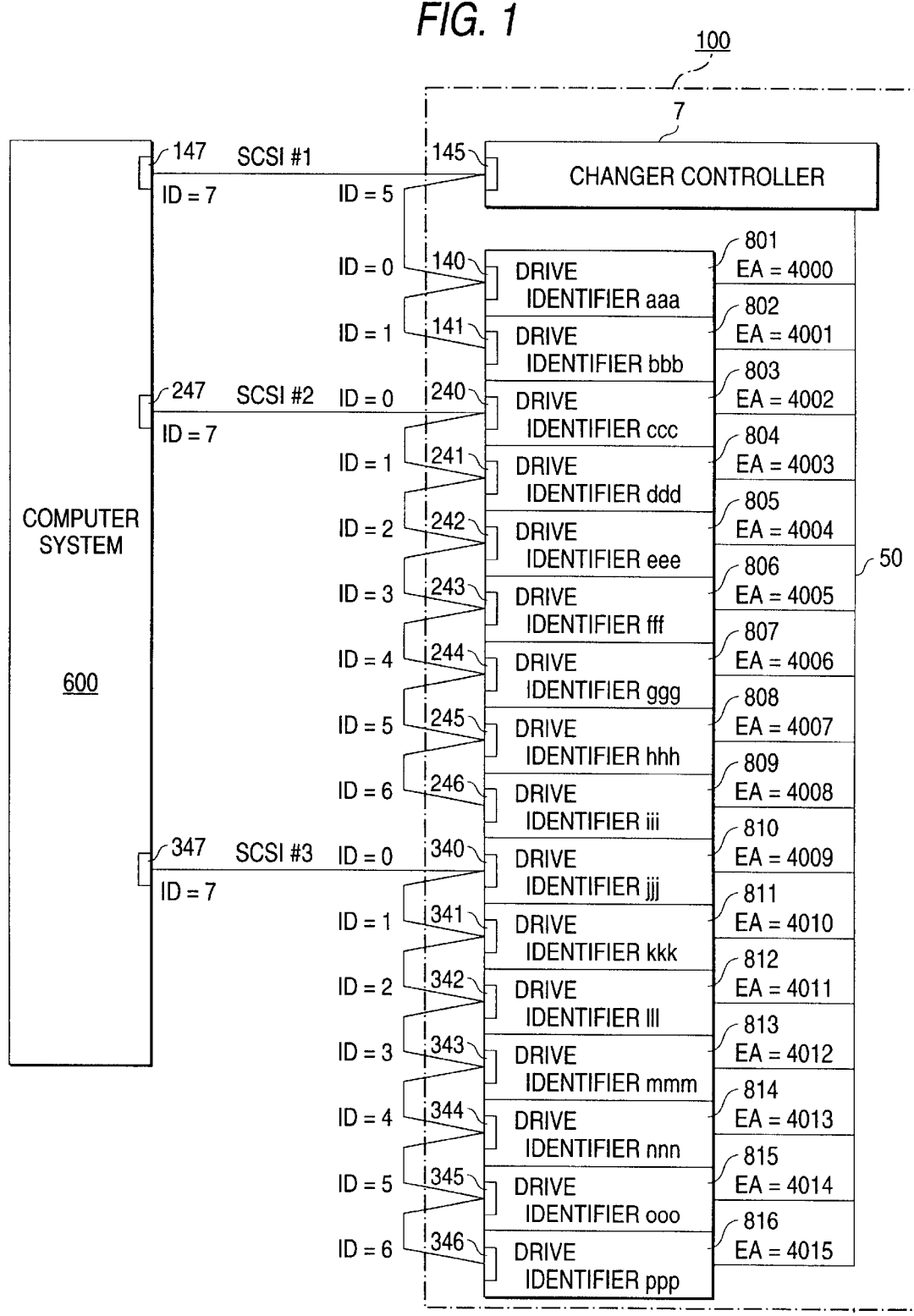
FIG. 1 is a block diagram of the electrical hardware configuration of a large changer according to the invention and connection relationships between the changer and a computer system.

Hereinafter, a preferred embodiment of the invention will be described in detail with reference to FIGS. 1 to 9. FIG. 1 schematically shows the electrical hardware configuration of a large changer according to the invention and incorporating sixteen disk drives, and connection relationships between the changer and a computer system. As shown in the figure, the changer 100 incorporates a changer controller 7 which mainly controls transportation of disks, and sixteen disk drives 801 to 816 which are mounted at positions identified by a series of element addresses (EA) EA=4000 to 4015 and serve as transport destinations of the disks, respectively.

The computer system 600 is connected to elements (the changer controller 7 and the disk drives 801 to 816) of the changer 100 via three SCSI buses of #1 to #3. Eight SCSI controllers respectively corresponding to SCSI IDs=0 to 7 are prepared for each of the three illustrated SCSI buses. In this example, with respect to SCSI bus #1, a SCSI controller 147 corresponding to SCSI ID=7 is connected to the computer system 600, a SCSI controller 145 corresponding to SCSI ID=5 is connected to the changer controller 7, and SCSI controllers 140 and 141 corresponding to SCSI IDs=0 and 1 are connected to two disk drives 801 and 802, respectively. There are no SCSI controllers corresponding to SCSI IDs =2, 3, 4, and 6. With respect to SCSI bus #2, a SCSI controller 247 corresponding to SCSI ID=7 is connected to the computer system 600, and SCSI controllers 240 to 246 corresponding to SCSI IDs=0 to 6 are connected to seven disk drives 803 to 809, respectively. With respect to SCSI bus #3, a SCSI controller 347 corresponding to SCSI ID=7 is connected to the computer system 600, and SCSI controllers 340 to 346 corresponding to SCSI IDs=0 to 6 are connected to seven disk drives 810 to 816, respectively.

In the changer 100, between the changer controller 7 and device connectors (not shown) corresponding to the element addresses (EA), a local bus line 50 elongates through which drive identification data are sucked from a disk drive connected to the connector, to the changer controller 7. In this example, with respect to at least the changer, identifiers respectively peculiar to the disk drives are used as the drive identification data, as described later in detail. For example, the product serial numbers of the disk drives may be used as the identifiers. In the subsequent drawings, the identifiers are indicated by symbols aaa to ppp. In the embodiment, the identifiers aaa to ppp are stored in nonvolatile memories such as EEPROMs or flash ROMs which are disposed in the disk drives 801 to 816, respectively.

In the large changer 100 also, prior to the control of disk transportation, the changer controller 7 acquires the identifiers aaa to ppp and the SCSI IDs serving as drive identification data from the sixteen incorporated disk drives 801 to 816 via the local bus line 50, and recognizes correspondence relationships between the element addresses EA, the disk drives (identifiers aaa to ppp), and the SCSI IDs. In order to realize a process of recognizing the correspondence relationships, the changer controller 7 comprises controlling means for, as an initializing process immediately after power-on, issuing an internal request command via the local bus line 50 each of the sixteen disk drives which are incorporated in the changer, and for obtaining replies from the disk drives. On the other hand, the disk drives 801 to 816 comprise controlling means for, in response to the internal request command which is sent from the changer controller 7 via the local bus line 50, sending the identifiers aaa to ppp stored in the respective disk drives, to the changer controller 7.

Figure 5:
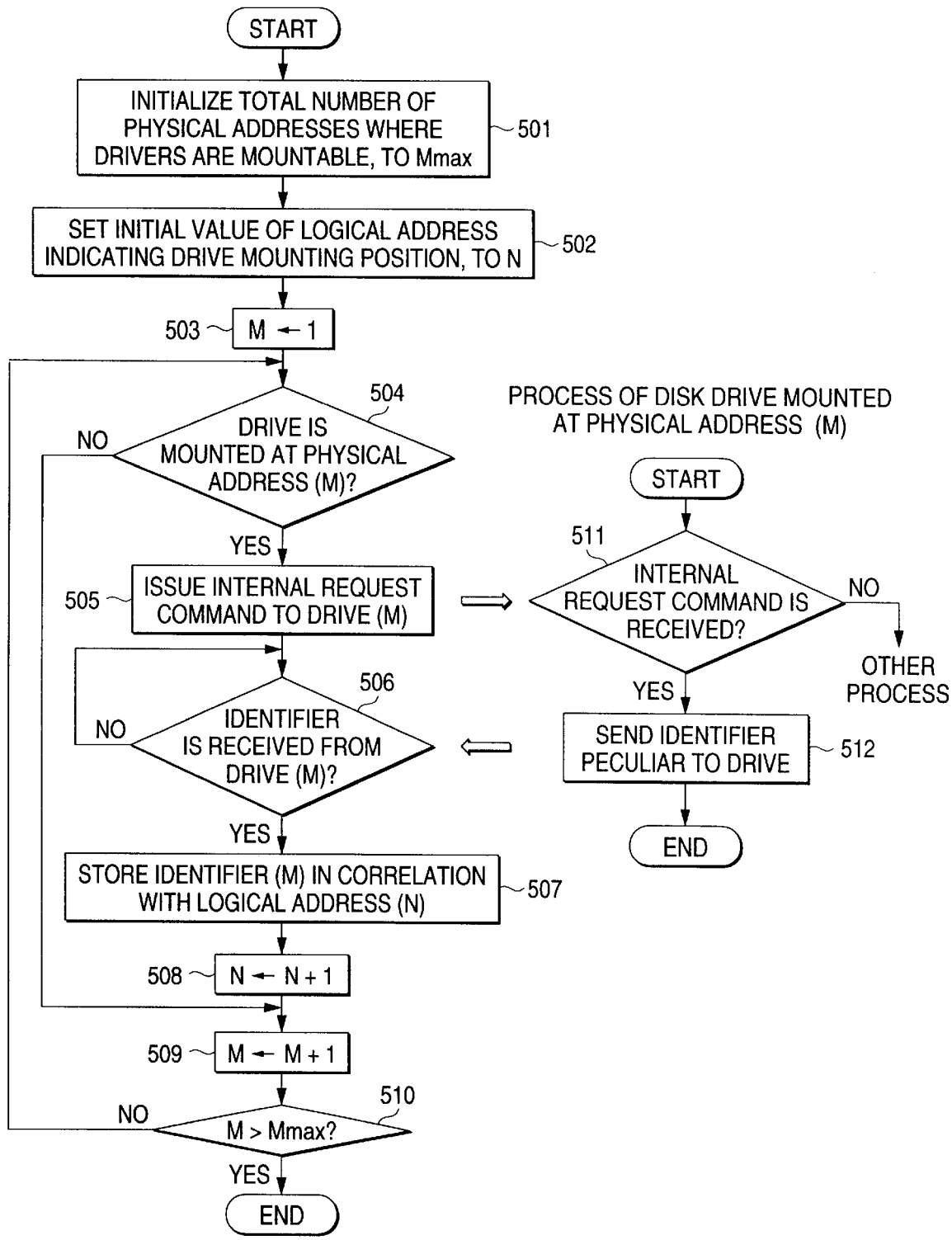
FIG. 5 is a flowchart showing the configuration of a process of sucking data for drive recognition.

The configuration of a control program for realizing the functions of the controlling means by a computer is shown in the flowchart of FIG. 5. As shown in the figure, the changer controller 7 performs the following processes as an initializing process which is to be performed immediately after power-on. The content of a physical address M in the changer where a disk drive can be mounted is gradually incremented by one from the initial value of 1 (steps 503 and 509). At each increment, it is checked whether a disk drive (M) designated by the content of the physical address M exists or not. If such a disk drive (M) exists (YES in step 504), the internal request command is issued to the disk drive (M) (step 505). After a reply to the command is received (YES in step 506), a process of storing the identifier (one of aaa to ppp) which has been received from the disk drive (M), as an identifier (M) in correlation with the logical address indicating the mounting position of the disk drive, i.e., an element address N is implemented (step 507). On the other hand, in response to reception of the internal request command (YES in step 511), the disk drive (M) mounted at the physical address M reads the identifier (aaa to ppp) stored in its own memory (an EEPROM, a flash memory, or the like), and sends the identifier to the changer controller 7 via the local bus line 50 (step 512). While repeating the above-mentioned processes, the control waits till the content of the physical address M reaches the total number Mmax (set in step 501) peculiar to the changer, or sixteen in the example of FIG. 1 (YES in step 510), and all the processes are then ended. The logical address N is initially set to a predetermined initial value (step 502), and incremented by one each time when the identifier of an existing disk drive is stored at the logical address (step 508).

Figure 10:
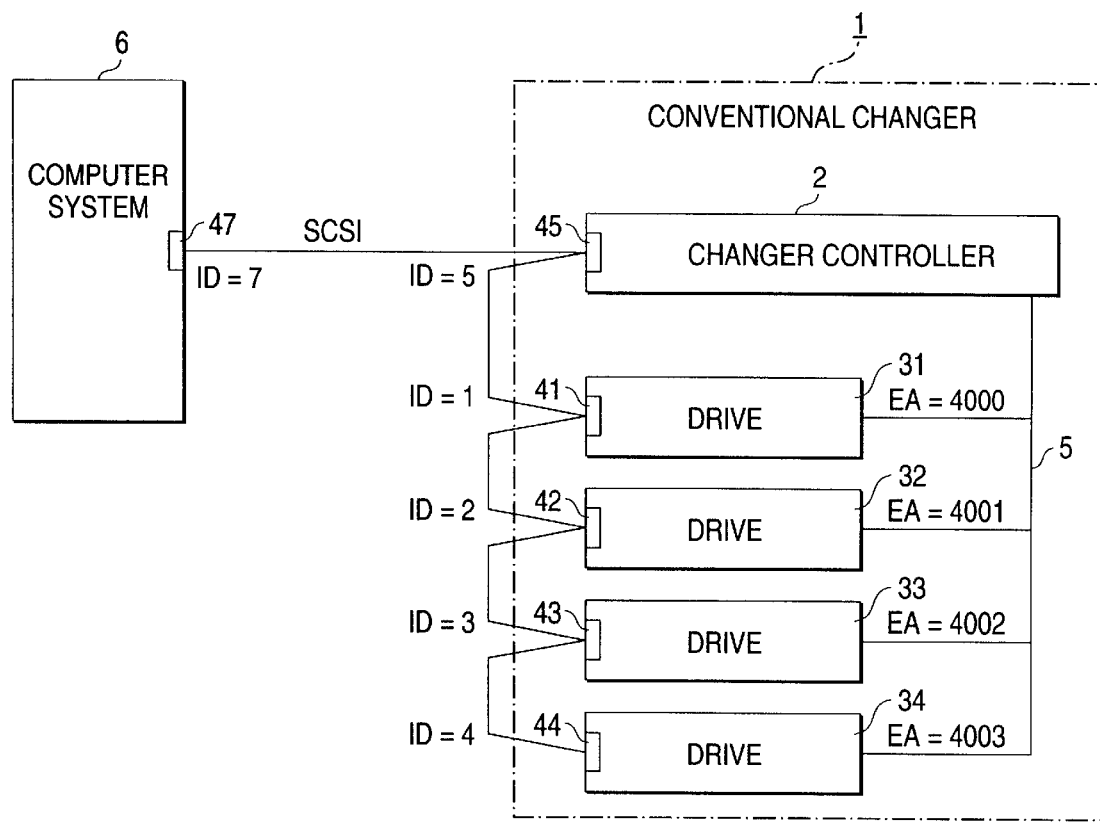
FIG. 10 is a block diagram of the electrical hardware configuration of a changer of the conventional art and connection relationships between the changer and a computer system.
Figure 12:
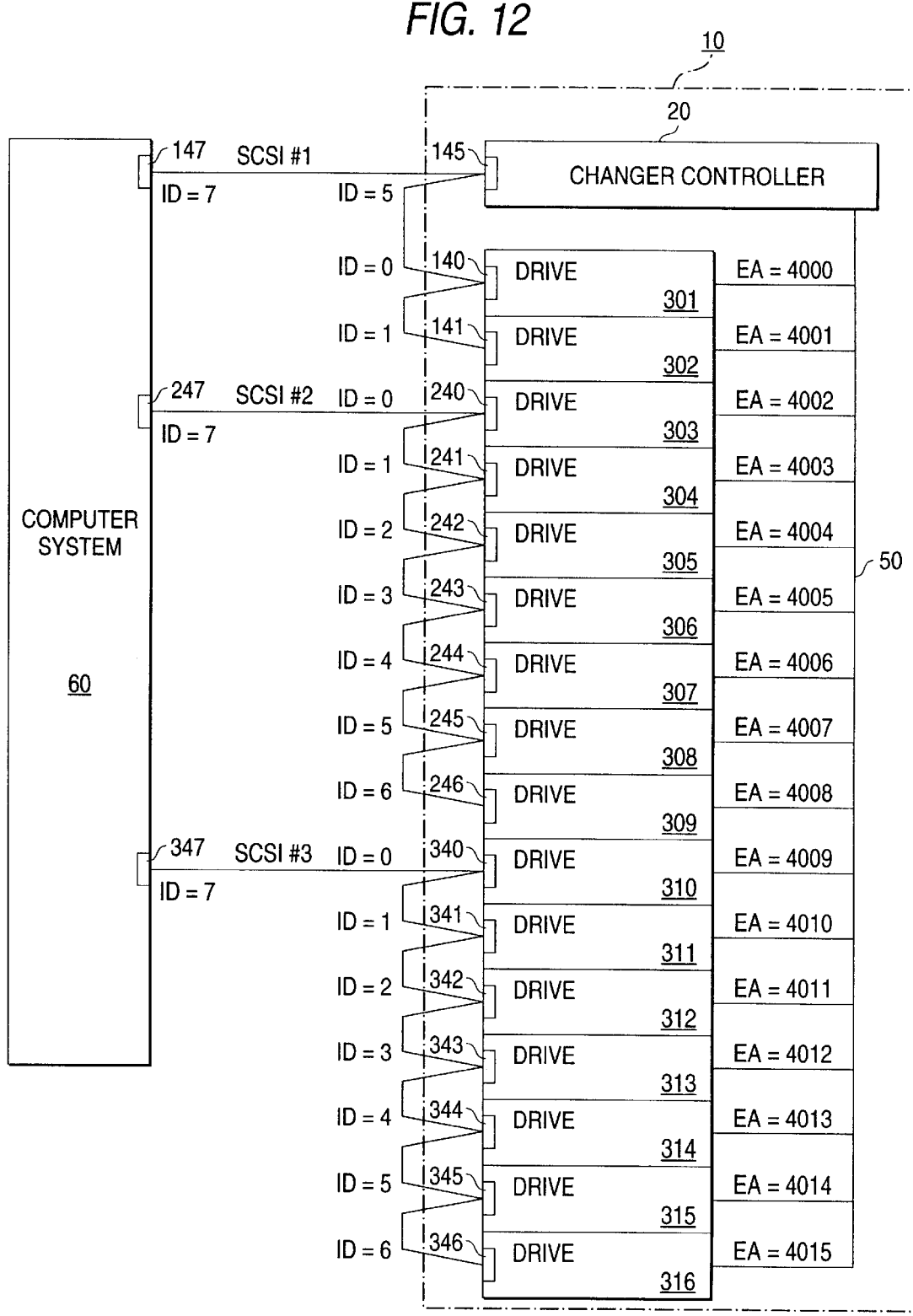
FIG. 12 is a block diagram of the electrical hardware configuration of a large disk changer and connection relationships between the changer and a computer system.

The correspondence relationships between the three items which are recognized by the changer controller 7 as described above are listed in the table of FIG. 2. As apparent from the table, according to the correspondence relationships, it will be seen that the sixteen disk drives 801 to 816 corresponding to the identifiers aaa to ppp are mounted at the series of addresses corresponding to the element addresses EA=4000 to 4015, respectively. The values of the SCSI IDs corresponding to the identifiers aaa to ppp are acquired for safety's sake, and are not directly related to the invention. When the acquired information contains the SCSI IDs, there is an advantage that, when one SCSI bus is used as in the conventional configuration shown in FIGS. 10 and 11, the disk drives can be recognized without using the identifiers aaa to ppp according to the invention. The acquisition of the SCSI IDs of the disk drives in correlation with the element addresses can be realized in any one of various know methods.

In the above-described example of FIG. 5, in order to recognize the correspondence relationships between the element addresses EA, the disk drives (identifiers aaa to ppp), and the SCSI IDs, the identifiers of the disk drives are sucked from the disk drives to the changer controller. The invention is not restricted to the example. Alternatively, the changer controller may give previously prepared identifiers to the incorporated disk drives, respectively, thereby recognizing the correspondence relationships between the element addresses EA, the disk drives, and the SCSI IDs. In the alternative, each of the disk drives has its peculiar identifier, only after the disk drive is mounted on the changer. In order to realize a process of recognizing the correspondence relationships according to this method, the changer controller 7 is provided with controlling means for, as an initializing process immediately after power-on, respectively sending identifiers via the local bus line 50 the sixteen disk drives which are incorporated in the changer, the identifiers being peculiar among the disk drives, and each of the disk drives 801 to 816 is provided with controlling means for receiving the identifier which is sent from the changer controller 7 via the local bus line 50, and for storing the identifier into a memory of the disk drive, such as a RAM.

Figure 9:
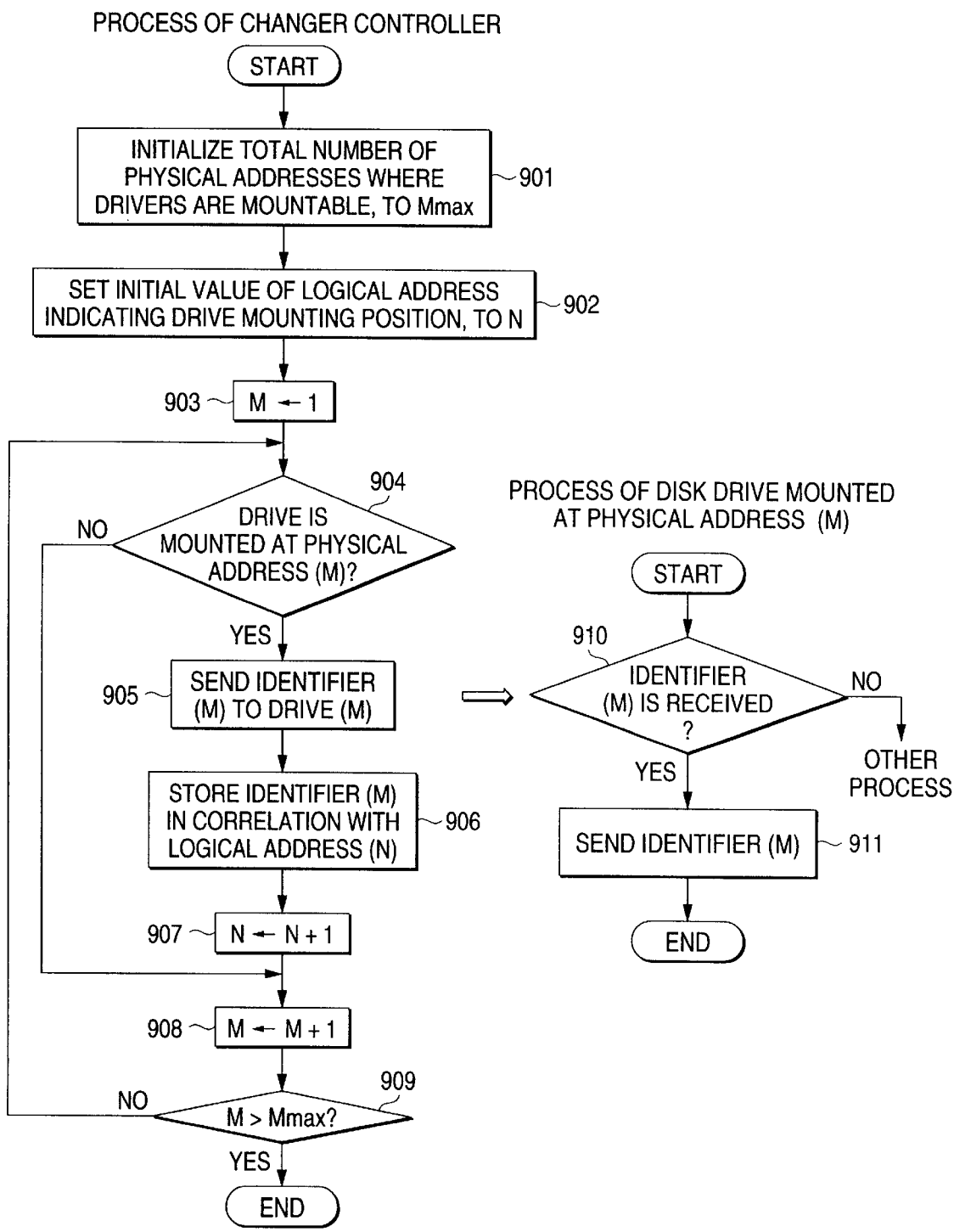
FIG. 9 is a flowchart showing the configuration of a process of sending data for drive recognition.

An example of a control program for realizing the method by a computer is shown in the flowchart of FIG. 9. As shown in the figure, the changer controller 7 performs the following processes as an initializing process which is to be performed immediately after power-on. The content of a physical address M in the changer where a disk drive can be mounted is gradually incremented by one from the initial value of 1 (steps 903 and 908). At each increment, it is checked whether a disk drive (M) designated by the content of the physical address M exists or not. If such a disk drive (M) exists (YES in step 904), the identifier (M) is sent to the disk drive (M) via the local bus line 50 (step 905), and then stored in correlation with the logical address N indicating the mounting position of the disk drive (step 906). On the other hand, in response to reception of the identifier (M) (YES in step 910), the disk drive (M) mounted at the physical address M stores the identifier (M) into its own memory such as a RAM (step 911). While repeating the above-mentioned processes, the control waits till the content of the physical address M reaches the total number Mmax (set in step 901) peculiar to the changer, or sixteen in the example of FIG. 1 (YES in step 909), and all the processes are then ended. The logical address N is initially set to a predetermined initial value (step 902), and incremented by one each time when the identifier of an existing disk drive is stored at the logical address N (step 907). The identifiers (M) are allocated to the incorporated disk drives (M), correspond to the element addresses of the disk drives in one to one relationship, and have values which are peculiar among the disk drives, respectively. In this example, identifiers aaa to ppp are allocated to the sixteen disk drives. The logical addresses N may be used as the identifiers. In the case where plural changers are connected to a computer system, numbers or the like peculiar to the changer controllers must be added to the identifiers so that disk drivers having the same identifier do not exist among different changers.

Prior to the start of the control, from the disk drives connected to SCSI buses #1 to #3, the computer system 600 acquires the identifiers (aaa to ppp) stored in the disk drives. For the purpose of the above, each of the disk drives is provided with controlling means for, in response to reception of an inquiry command via the corresponding SCSI controller, sending the corresponding identifier (aaa to ppp) to the computer system 600 serving as the request source, via the SCSI controller. According to this configuration, the computer system 600 can recognize relationships between the SCSI controllers identified by SCSI buses #1 to #3 and SCSI IDs (0 to 7), and the disk drives (identified by the identifiers aaa to ppp) connected to the SCSI controllers. In order to perform the above, the computer system 600 is provided with controlling means for, prior to the start of the control, sequentially issuing the inquiry command to the SCSI controllers (SCSI IDs=0 to 7) connected to SCSI buses #1 to #3, and for acquiring the identifier (aaa to ppp) and the device type which are sent from the SCSI controllers in response to the command. On the other hand, each of the disk drives is provided with controlling means for, in response to reception of the inquiry command via the corresponding SCSI controller, sending its own identifier (aaa to ppp) to the computer system 600 serving as the request source, via the SCSI controller.

Figure 6:
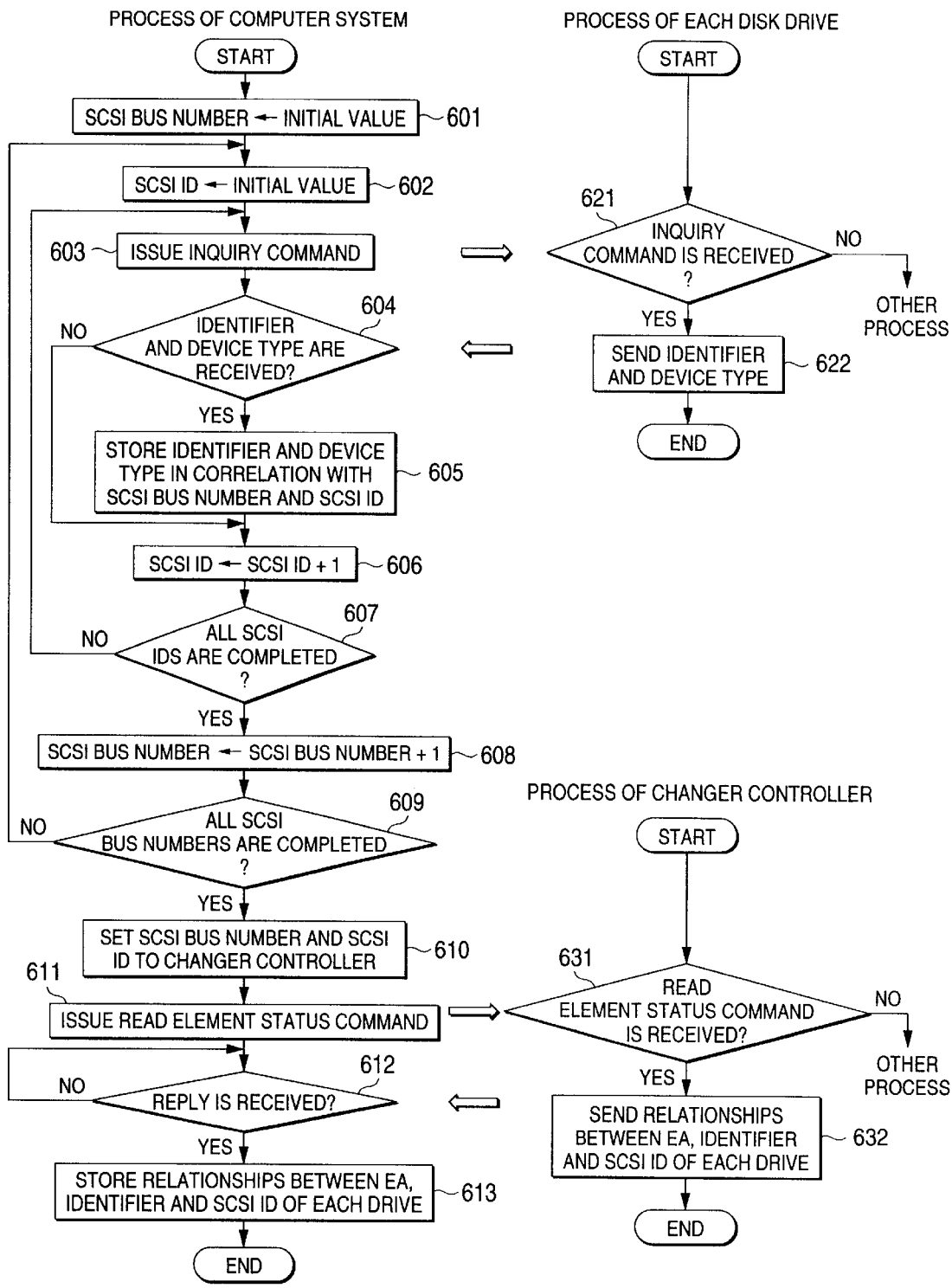
FIG. 6 is a flowchart showing the configuration of a process of recognizing address relationships by the computer system.

The configuration of a control program for realizing the functions of these controlling means by a computer is shown in an approximately upper half of the flowchart of FIG. 6. Referring to the figure, when the control is started, the computer system 600 sets the SCSI bus number and the SCSI ID to their respective initial values (steps 601 and 602). While incrementing the values from their lower significant digits (steps 606 and 608), the inquiry command is issued to the SCSI controller which is designated by their information (step 603). After a reply to the command is received (YES in step 604), a process of storing the SCSI bus number, the SCSI ID, the identifier (aaa to ppp), and the device type in correlation with one another is implemented (step 605).

On the other hand, after the inquiry command arrives (YES in step 621), each of the disk drives implements a process of sending its own identifier (aaa to ppp) and the device type to the computer system 600 (step 622). As a result, the computer system 600 recognizes correspondence relationships between the SCSI bus number, the SCSI ID, the identifier (aaa to ppp), and the device type.

The thus recognized correspondence relationships are listed in the table of FIG. 3. From the correspondence relationships shown in the table, it will be seen that two disk drives 801 and 802 corresponding to SCSI bus #1 and respectively to the SCSI IDs=0 and 1 correspond to the identifiers aaa and bbb, respectively. Similarly, it will be seen that seven disk drives 803 to 809 corresponding to SCSI bus #2 and respectively to the SCSI IDs=0 to 6 correspond to the identifiers ccc to iii, respectively. Similarly, it will be seen that seven disk drives 810 to 816 corresponding to SCSI bus #3 and respectively to the SCSI IDs=0 to 6 correspond to the identifiers jjj to ppp, respectively. Furthermore, it will be seen that the changer controller 7 is connected to a SCSI controller corresponding to SCSI bus #1 and the SCSI ID=5.

The computer system 600 acquires the correspondence relationships shown in the table of FIG. 2, from the changer controller 7. For the purpose of the above, the computer system 600 is provided with controlling means for issuing a read element status command onto the SCSI bus while designating the SCSI bus number and the SCSI ID which are set to the changer controller 7, and for, after a reply to the command is received, storing relationships between the EAs, the identifiers, and the SCSI IDs of the drives. On the other hand, the changer controller 7 is provided with controlling means for, in response to reception of the read element status command via the SCSI controller 145, sending the previously recognized correspondence relationships shown in FIG. 2 to the computer system 600 serving as the request source, via the SCSI controller 145.

The configuration of a control program for realizing the functions of these controlling means by a computer is shown in an approximately lower half of the flowchart of FIG. 6. As shown in the figure, from the correspondence relationships shown in the table of FIG. 3, the computer system 600 obtains the SCSI bus number and the SCSI ID of the SCSI controller 145 to which the changer controller 7 is connected, and issues the read element status command to the corresponding SCSI controller 145 (step 611). After a reply to the command arrives from the changer controller 7 (YES in step 612), a process of storing correspondence relationships between the element addresses (EA), the identifier (aaa to ppp), and the SCSI IDs of the drives is implemented (step 613). On the other hand, after reception of the read element status command (YES in step 631), the changer controller 7 sends the correspondence relationships between the element addresses (EA), the identifier (aaa to ppp), and the SCSI IDs of the drives shown in the table of FIG. 2, to the computer system 600. As a result of the above processes, for each of the disk drives identified by the identifiers aaa to ppp, the correspondence relationships between the element addresses (EA) identified by the element address (EA) indicating the position of the disk drive, and the SCSI number and the SCSI ID obtained when the disk drive is seen from the side of the computer system 600 are stored in the computer system 600. The thus recognized correspondence relationships between the three items are listed in the table of FIG. 4. From the table, it will be easily seen that, for example, the disk drive identified by the identifier ddd is mounted at the position corresponding to the element address 4003, and the address of the drive on the SCSI bus consists of SCSI bus #2 and SCSI ID=1.

Figure 7:
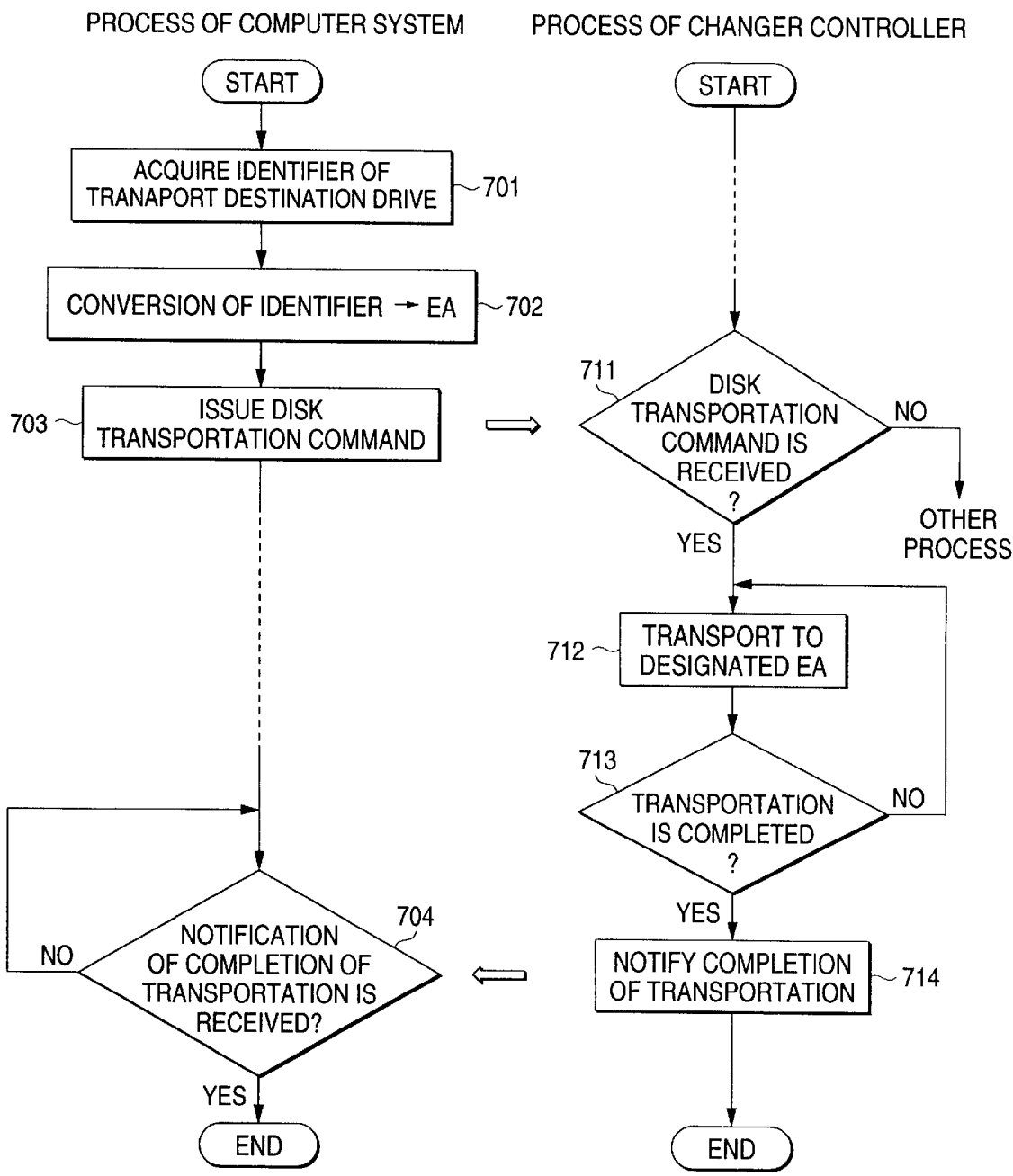
FIG. 7 is a flowchart showing the configuration of a process of disk transportation.

Next, the control of transportation of a disk by using the correspondence relationships shown in the table of FIG. 4 will be described in order to perform the control, the changer controller 7 is provided with controlling means for, in response to reception of the disk transportation command via the SCSI controller 145, transporting the disk designated by the command to the position of the element address designated by the command. The configuration of a control program for realizing the function of the controlling means is shown in the flowchart of FIG. 7.

When a specific disk is to be transported to a disk drive identified by a certain identifier, the computer system first acquires the identifier of the drive disk from the application program (step 701), converts the identifier into the element address with reference to the correspondence relationships shown in the table of FIG. 4 (step 702), and issues the disk transportation command to the changer controller 7 (step 703). In the changer controller 7, after the disk transportation command is received (YES in step 711), transportation of the disk to the designated element address is started (step 712), and, when the transportation is completed (YES in step 713), a notification of completion of the transportation is sent to the computer system 600 (step 714). When the notification is received by the computer system (YES in step 704), the disk transportation process is ended. As the identifier of the transport destination drive which the controlling means acquires from the application program, usually, the OS (Operating System) of the computer system allocates identifiers (drive letters) which are peculiar only in the system, to the disk drives each of which is identified by the SCSI bus number and the SCSI ID. An application program or the like designates each of the disk drives by using the identifier.

Figure 8:
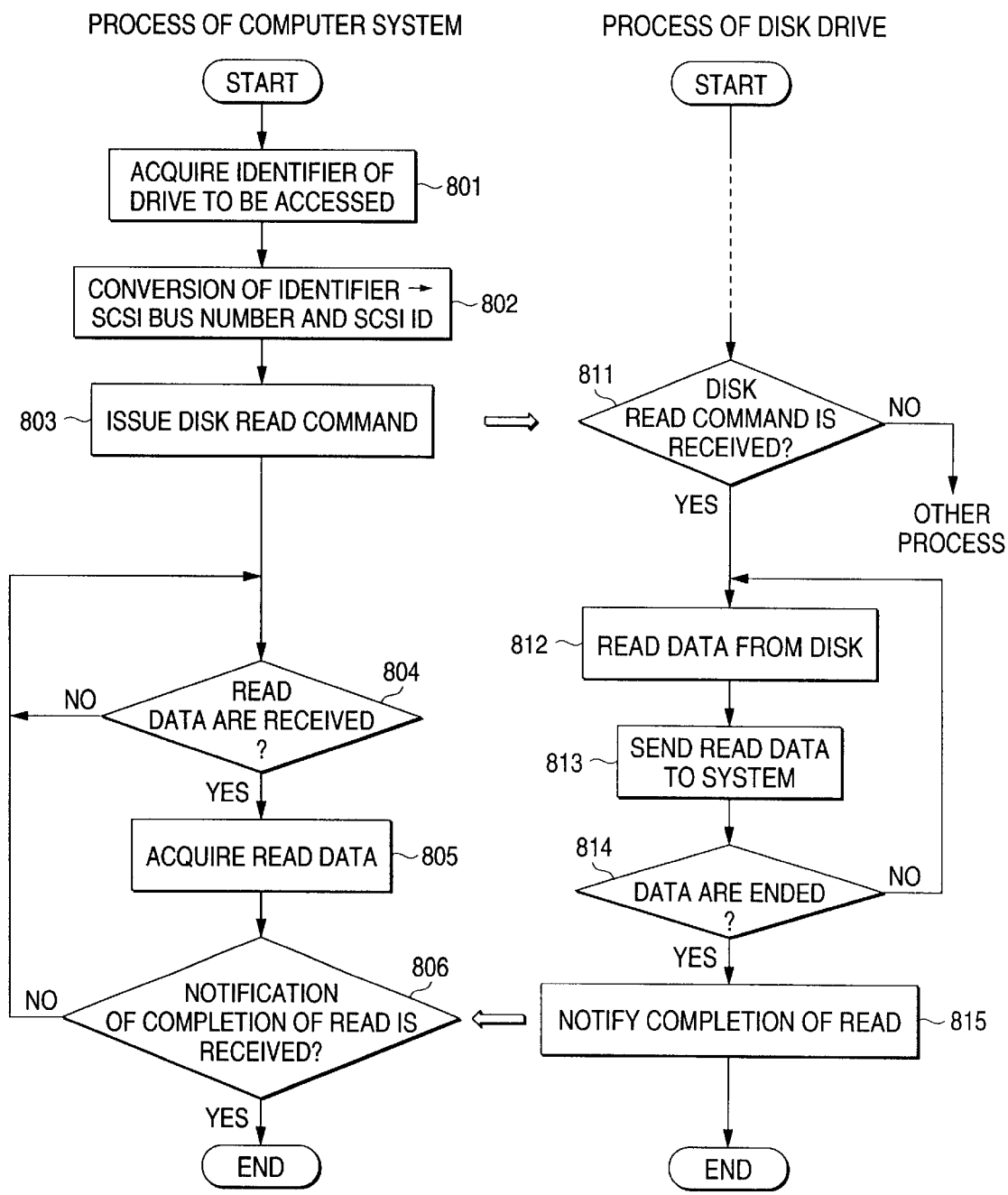
FIG. 8 is a flowchart showing the configuration of a process of disk access.

Next, processes of controlling a disk drive to which a disk has been transported, and reading information from the disk will be described. In order to perform the processes, each of the disk drives is provided with controlling means for, in response to reception of the disk access command via the SCSI controller, implementing an accessing process (a read process or a write process) designated by the command on a disk loaded in the disk drive. The configuration of a control program for realizing the function of the controlling means by a computer is shown in FIG. 8.

As shown in the figure, the computer system 600 acquires the identifier of a disk drive which is to be accessed by an application program (step 801), converts the identifier into the CSI bus number and the SCSI ID with reference to the correspondence relationships shown in the table of FIG. 4 (step 802), and issues a disk read command onto the SCSI bus on the basis of the obtained information (step 803). After the disk read command is received (YES in step 811), the disk drive connected to the corresponding SCSI controller repeatedly implements (NO in step 814) processes of reading data from the disk (step 812) and sending the read data to the computer system 600 (step 813). After the data are ended (YES in step 814), the disk drive sends a read completion notification to the computer system 600 (step 815). On the other and, after the read data are received (YES in step 804), the computer system 600 repeats acquisition of the data (step 85, and NO in step 806). After the read completion notification is received (YES in step 806), all the processes are completed.

As described above, prior to the disk transportation control, the changer of the embodiment acquires the identifiers (aaa to ppp) respectively peculiar to the sixteen incorporated disk drives 801 to 816 via the local bus line 50, from the disk drives, and recognizes the correspondence relationships between the element addresses (EA=4000 to 4015) and the disk drives (identifiers=aaa to ppp). In response to arrival of the read element status command, the recognized correspondence relationships are sent to the computer system 600 serving as the request source, via the SCSI controller 145. In response to arrival of the inquiry command, furthermore, the disk drives 801 to 816 send the identifiers (aaa to ppp) to the computer system 600 serving as the request source, via the SCSI controllers 140, 141, 240 to 246, and 340 to 346. On the basis of an identifier which is commonly contained in sets of information respectively obtained through two routes, therefore, the computer system 600 can correctly recognize correspondence relationships showing the element address EA where a disk drive identified by the SCSI bus number and the SCSI ID is mounted.

In the embodiment, the identifiers (aaa to ppp) which are sent as a reply to the changer controller 7 or the computer system 600 are stored in a nonvolatile memory such as an EEPROM or a flash ROM in the respective disk drives. In order to produce the identifier peculiar to the disk drive, therefore, hardware modification of the changer controller is never required, and it is requested only to apply small software modification on the data transfer which is to be implemented via the bus line. In both the exterior and the interior of the changer, peculiar identifiers can be easily allocated to the disk drives, respectively. Even when plural changers are used in a large scale system, therefore, correspondence relationships between the electrical connection routes (access paths) to disk drives via SCSI buses and element addresses which are used in the disk transportation to the drives can be surely constructed.

Since the changer controller 7 gives the previously prepared identifiers (aaa to ppp) to the incorporated disk drives, it is not necessary to previously store the identifiers, and the disk drives are not required to have a nonvolatile memory for storing the identifier.

Since the read element status command which is defined in the SCSI standard is used as a condition for activating the control of transmission of the correspondence relationships from the changer controller 7 to the computer system 600, there is an advantage that necessary software modifications which are to be performed in the computer system 600 and the changer controller 7 can be minimized in degree.

Since the inquiry command which is defined in the SCSI standard is used as a condition for activating the control of transmission of the identifiers from the disk drives 801 to 816 to the computer system 600, there is an advantage that necessary software modifications which are to be performed in the computer system 600 and the disk drives 801 to 816 can be minimized in degree.

The product serial numbers of the disk drives are used as the identifiers aaa to ppp. When the identifiers are incorporated into the disk drives in the production process of the disk drives, therefore, there arises an advantage that, irrespective of the configuration of the SCSI bus numbers and the SCSI IDs, each of the disk drives can be most surely identified because no identical serial numbers exist in all the products.

As apparent also from the embodiment, according to the invention, in a changer wherein a computer system accesses disk drives by using two or more SCSI busses in such a case where disk drives are incorporated in a larger number than the maximum number of devices that can be supported by one SCSI bus, the computer system can correctly recognize correspondence relationships between the disk drives and element addresses where the disk drives are mounted. Therefore, a changer of this kind can be expanded in scale by using exiting general purpose SCSI busses.

What is claimed is:

1. A changer comprising:

a changer controller which controls transportation of an information recording medium; and information recording medium driving means mounted at a position indicated by an element address serving as a transport destination of said information recording medium, wherein said changer controller includes:

first controlling means for recognizing correspondence relationships between identifiers respectively peculiar to incorporated information recording medium driving means and element addresses, and for, in response to a first command, sending information relating to the correspondence relationships between the identifiers and the element addresses, to a source of the command, and each of said information recording medium driving means includes:

second controlling means for, in response to a second command, sending the identifier, to a source of the command, said changer further comprising at least two ports, each capable of being connected to a bus, and wherein the number of said information recording medium driving means exceeds the maximum number of said information recording medium driving means which can be supported by any one of said ports.

2. The changer according to claim 1, wherein said identifier is previously recorded in said information recording medium driving means, and said first controlling means acquires the identifier from incorporated information recording medium driving means, to recognize the correspondence relationship between said identifier and the element address.

3. The changer according to claim 2, wherein said identifier contains a product serial number of said information recording medium driving means.

4. The changer according to claim 1, wherein said first controlling means gives to incorporated information recording medium driving means said identifier corresponding to an element address of said incorporated information recording medium driving means, and said information recording medium driving means stores the given identifier.

5. The changer according to claim 1, wherein said changer controller and said information recording medium driving means are connected to a SCSI controller, wherein said SCSI controller is capable of being connected to a SCSI bus.

6. The changer according to claim 5, wherein the first command is a read element status command which is defined in the SCSI standard.

7. The changer according to claim 5, wherein the second command is an inquiry command which is defined in the SCSI standard.

8. A changer comprising:

a changer controller which controls transportation of an information recording medium; and information recording medium drivers mounted at a position indicated by an element address serving as a transport destination of said information recording medium, wherein said changer controller includes:

first controller for recognizing correspondence relationships between identifiers respectively peculiar to incorporated information recording medium drivers and element addresses, and for, in response to a first command, sending information relating to the correspondence relationships between the identifiers and the element addresses, to a source of the command, and each of said information recording medium drivers includes:

second controller for, in response to a second command, sending the identifier, to a source of the command, said changer further comprising at least two ports, each capable of being connected to a bus, and wherein the number of said information recording medium drivers exceeds the maximum number of said information recording medium drivers which can be supported by any one of said ports.

9. The changer according to claim 8, wherein said identifier is previously recorded in said information recording medium driver, and said first controller acquires the identifier from incorporated information recording medium driver, to recognize the correspondence relationship between said identifier and the element address.

10. The changer according to claim 9, wherein said identifier contains a product serial number of said information recording medium driver.

11. The changer according to claim 8, wherein said first controller gives to incorporated information recording medium driver said identifier corresponding to an element address of said incorporated information recording medium driver, and said information recording medium driver stores the given identifier.

12. The changer according to claim 8, wherein said changer controller and said information recording medium driver are connected to a SCSI controller, wherein said SCSI controller is capable of being connected to a SCSI bus.

13. The changer according to claim 12, wherein the first command is a read element status command which is defined in the SCSI standard.

14. The changer according to claim 12, wherein the second command is an inquiry command which is defined in the SCSI standard.

* * * * *